United States Patent
Son et al.

(10) Patent No.: US 11,470,506 B2
(45) Date of Patent: *Oct. 11, 2022

(54) WIRELESS COMMUNICATION METHOD USING FRAME AGGREGATION AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

(*) Notice: Subject to any disclaimer, the term of this patent is extended or adjusted under 35 U.S.C. 154(b) by 62 days.

This patent is subject to a terminal disclaimer.

(21) Appl. No.: 17/062,487

(22) Filed: Oct. 2, 2020

(65) Prior Publication Data

US 2021/0037417 A1    Feb. 4, 2021

Related U.S. Application Data

(63) Continuation of application No. 15/512,027, filed as application No. PCT/KR2015/000976 on Sep. 17, 2015, now Pat. No. 10,820,233.

(30) Foreign Application Priority Data

Sep. 17, 2014   (KR) ................ 10-2014-0123906

(51) Int. Cl.
  *H04W 28/06* (2009.01)
  *H04W 84/12* (2009.01)
  (Continued)

(52) U.S. Cl.
  CPC ........... *H04W 28/06* (2013.01); *H04L 1/0084* (2013.01); *H04L 1/1614* (2013.01);
  (Continued)

(58) Field of Classification Search
  None
  See application file for complete search history.

(56) References Cited

U.S. PATENT DOCUMENTS 10,820,233 B2 * 10/2020 Son ................ H04L 1/1887
2008/0049654 A1   2/2008 Otal et al.
(Continued)

OTHER PUBLICATIONS

Notice of Allowance for Korean Patent Application No. 10-2017-7007423 dated Mar. 17, 2021 and its English translation provided by Applicant's foreign counsel.
(Continued)

*Primary Examiner* — Saad Khawar
(74) *Attorney, Agent, or Firm* — Ladas & Parry, LLP

(57) ABSTRACT

A method for constructing an aggregated frame for efficient wireless communication in a high-density environment and a wireless communication method using the same is provided. The wireless communication method may include: generating an aggregated MPDU (A-MPDU) including a plurality of MAC protocol data unit (MPDU) groups to which independent modulation and coding schemes (MCSs) are applied, respectively; and transmitting the generated A-MPDU through the transceiver and a wireless communication terminal may use the same.

10 Claims, 13 Drawing Sheets

(51) Int. Cl.
*H04L 1/00* (2006.01)
*H04L 1/18* (2006.01)
*H04L 1/16* (2006.01)

(52) U.S. Cl.
CPC ........... *H04L 1/1887* (2013.01); *H04W 84/12* (2013.01); *H04L 1/1607* (2013.01); *H04L 1/1621* (2013.01)

(56) References Cited

U.S. PATENT DOCUMENTS

| | | | | |
|---|---|---|---|---|
| 2012/0314697 | A1* | 12/2012 | Noh | H04L 1/1628 370/338 |
| 2013/0223345 | A1* | 8/2013 | Asterjadhi | H04W 28/06 370/328 |
| 2014/0036895 | A1 | 2/2014 | Liu et al. | |
| 2014/0038661 | A1 | 2/2014 | Niu et al. | |
| 2014/0044117 | A1 | 2/2014 | Stacey et al. | |
| 2014/0146736 | A1 | 5/2014 | Kim et al. | |
| 2014/0254408 | A1 | 9/2014 | Shukla et al. | |
| 2017/0289844 | A1 | 10/2017 | Son et al. | |

OTHER PUBLICATIONS

Office Action for Korean Patent Application No. 10-2021-7018865 dated Jun. 30, 2021 and its English translation provided by Applicant's foreign counsel.
Notice of Allowance for Korean Patent Application No. 10-2021-7018862 dated Jul. 5, 2021 and its English translation provided by Applicant's foreign counsel.
International Search Report for PCT/KR2015/009766 dated Mar. 18, 2016 and its English translation from WIPO.
Written Opinion of the International Searching Authority for PCT/KR2015/009766 dated Mar. 18, 2016 and its English machine translation by Google Translate.
Notice of Allowance dated Jun. 22, 2020 for U.S. Appl. No. 15/512,027 (now published as 2017/0289844).
Final Office Action dated Jan. 7, 2020 for U.S. Appl. No. 15/512,027 (now published as 2017/0289844).
Non-Final Office Action dated Sep. 16, 2019 for U.S. Appl. No. 15/512,027 (now published as 2017/0289844).
Advisory Action dated Mar. 26, 2019 for U.S. Appl. No. 15/512,027 (now published as 2017/0289844).
Final Office Action dated Nov. 19, 2018 for U.S. Appl. No. 15/512,027 (now published as 2017/0289844).
Non-Final Office Action dated Jul. 13, 2018 for U.S. Appl. No. 15/512,027 (now published as 2017/0289844).
Office Action for Korean Patent Application No. 10-2022-7000485 dated Feb. 23, 2022 and its English translation provided by Applicant's foreign counsel.
Office Action for U.S. Appl. No. 17/062,537 dated Mar. 24, 2022.
Office Action for U.S. Appl. No. 17/062,537 dated Jul. 20, 2022.

* cited by examiner

| Frame Control | Duration | RA | TA | BA Control | Starting Sequence Control | Block ACK Bitmap | FCS |
|---|---|---|---|---|---|---|---|

20a

8 Byte

FIG. 10

WIRELESS COMMUNICATION METHOD USING FRAME AGGREGATION AND WIRELESS COMMUNICATION TERMINAL USING SAME

CROSS-REFERENCE TO RELATED APPLICATIONS

This application is a continuation of U.S. patent application Ser. No. 15/512,027 filed on Mar. 16, 2017, which is the U.S. National Stage of International Patent Application No. PCT/KR2015/009766 filed on Sep. 17, 2015, which claims the priority to Korean Patent Application No. 10-2014-0123906 filed in the Korean Intellectual Property Office on Sep. 17, 2014, the entire contents of which are incorporated herein by reference.

TECHNICAL FIELD

The present invention relates to a method for constructing an aggregated frame for efficient wireless communication in a high-density environment and a wireless communication method using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a radio interface accepted by 802.11n, such as a wider radio frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

As described above, an object of the present invention is to provide high-efficiency/high-performance wireless LAN communication in a high-density environment.

Technical Solution

In order to achieve the objects, the present invention provides a wireless communication method and a wireless communication terminal as below.

First, an embodiment of the present invention provides a wireless communication terminal including: a transceiver transmits and receives a wireless signal; and a processor controls an operation of the wireless communication terminal, wherein the processor generates an aggregated MPDU (A-MPDU) including a plurality of MAC protocol data unit (MPDU) groups to which independent modulation and coding schemes (MCSs) are applied, respectively, and transmits the generated A-MPDU through the transceiver.

According to an embodiment of the present invention, the A-MPDU may include at least one data MPDU group and at least one control MPDU group.

In this case, an MCS more robust than an MCS applied to an MPDU of the data MPDU group may be applied to an MPDU of the control MPDU.

In an embodiment, a binary phase shift keying (BPSK) modulation may be applied to the MPDU of the control MPDU group.

Further, the control MPDU group may include a trigger frame soliciting simultaneous transmission of uplink data of multiple users.

Further, the control MPDU group may include a multi-STA block ACK frame corresponding to uplink data simultaneously transmitted by the multiple users Further, the control MPDU group may include a last MPDU of the A-MPDU.

According to an embodiment of the present invention, the data MPDU group may be located before the control MPDU group, and an MPDU delimiter of a first MPDU of the control MPDU group may include information representing a start of the control MPDU group.

In this case, the information representing the start of the control MPDU group may be indicated through a predetermined bit of the MPDU delimiter.

According to an embodiment of the present invention, the A-MPDU may include a first MPDU group and a second MPDU group to which different MCSs are applied.

In an embodiment, preamble information corresponding to the A-MPDU may indicate a basic MCS applied to the A-MPDU including the first MPDU group, and MPDU delimiter information of a first MPDU of the second MPDU group may indicate that an MCS different from the basic MCS is applied to the second MPDU group.

In this case, when the MPDU delimiter information of the first MPDU indicates a change of the MCS, a predetermined MCS may be applied to the second MPDU group.

In an embodiment, the predetermined MCS may be binary phase shift keying (BPSK) modulation.

According to another embodiment, when the MPDU delimiter information of the first MPDU indicates a change of the MCS, an MCS having an MCS index difference of a predetermined offset may be applied to the second MPDU group.

In this case, an MCS applied to the second MPDU group may have an MCS index value lower than an MCS applied to the first MPDU group.

In this case, the MPDU delimiter information may indicate whether the MCS is changed through flag information.

In addition, an embodiment of the present invention provides a wireless communication method including: generating an aggregated MPDU (A-MPDU) including a plurality of MAC protocol data unit (MPDU) groups to which independent modulation and coding schemes (MCSs) are applied, respectively; and transmitting the generated A-MPDU.

Next, another embodiment of the present invention provides a wireless communication terminal including: a transceiver transmits and receives a wireless signal; and a processor controls an operation of the wireless communication terminal, wherein the processor transmits an A-MPDU composed of a plurality of MPDUs through the transceiver, receives a block ACK corresponding to the A-MPDU, and determines a channel access method based on block ACK bitmap information of the received block ACK.

According to an embodiment of the present invention, the block ACK bitmap may be divided into a plurality of sections including a first section and a second section, and the channel access method may be determined based on the number of bits having a value of 0 for each section.

In an embodiment, the processor may increase a contention window for a backoff procedure when the number of bits having the value of 0 in the first section is greater than or equal to a predetermined first threshold.

According to another embodiment, the processor may perform a link adaptation process when the number of bits having the value of 0 in the second section is equal to or greater than a predetermined second threshold.

In this case, the link adaptation process may include modifying a modulation and coding scheme (MCS), and the processor may transmit new data using an MCS more robust than an MCS applied to the A-MPDU.

According to yet another embodiment, the processor may reduce an MPDU aggregation size of the A-MPDU when the number of bits having the value of 0 in the second section is equal to or greater than a predetermined third threshold.

In addition, another embodiment of the present invention provides a wireless communication method including: transmitting an A-MPDU composed of a plurality of MPDUs; receiving a block ACK corresponding to the A-MPDU; and determining a channel access method based on block ACK bitmap information of the received block ACK.

Advantageous Effects

According to an embodiment of the present invention, a transmission is performed by efficiently combining a plurality of data when performing wireless communication, thereby improving a data transmission rate.

In addition, according to the embodiment of the present invention, it is possible to adaptively determine a collision situation of the terminal and a channel estimation error situation according to the transmission of the aggregated frame, and to perform the channel access method optimized for each situation.

DESCRIPTION OF DRAWINGS

FIG. 10 is a diagram illustrating an embodiment of a block ACK frame structure corresponding to an A-MPDU.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application No. 10-2014-0123906 filed in the Korean Intellectual Property Office and the embodiments and mentioned items described in the respective application, which forms the basis of the priority, shall be included in the Detailed Description of the present application.

Figure 1:
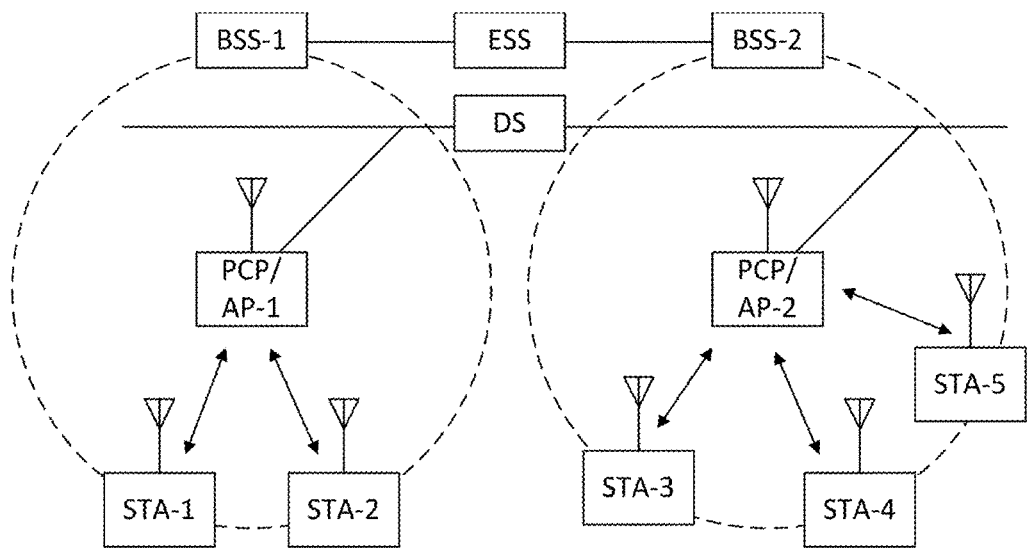
FIG. 1 is a diagram illustrating a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a radio medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
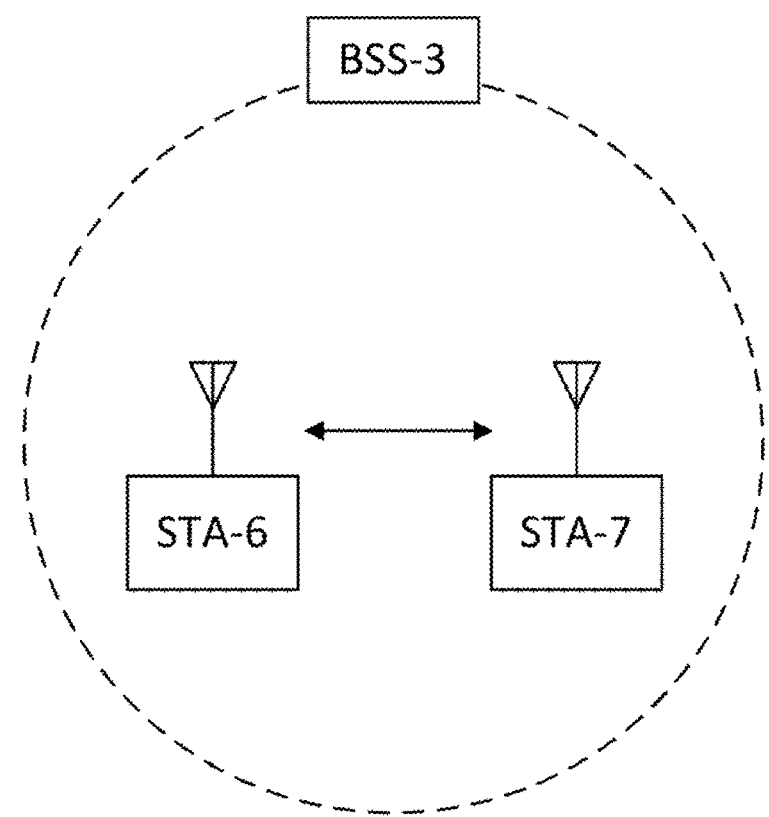
FIG. 2 is a diagram illustrating a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STAT are not connected with the AP. The independent BSS is not permitted to access the distribution system and forms a self-contained network. In the independent BSS, the respective stations STA6 and STAT may be directly connected with each other.

Figure 3:
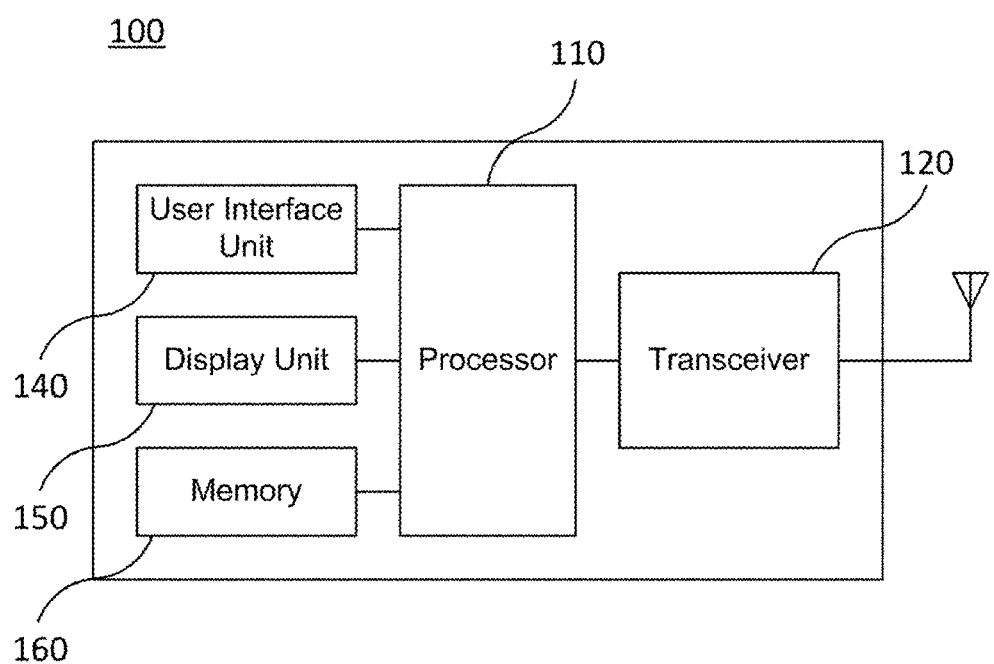
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
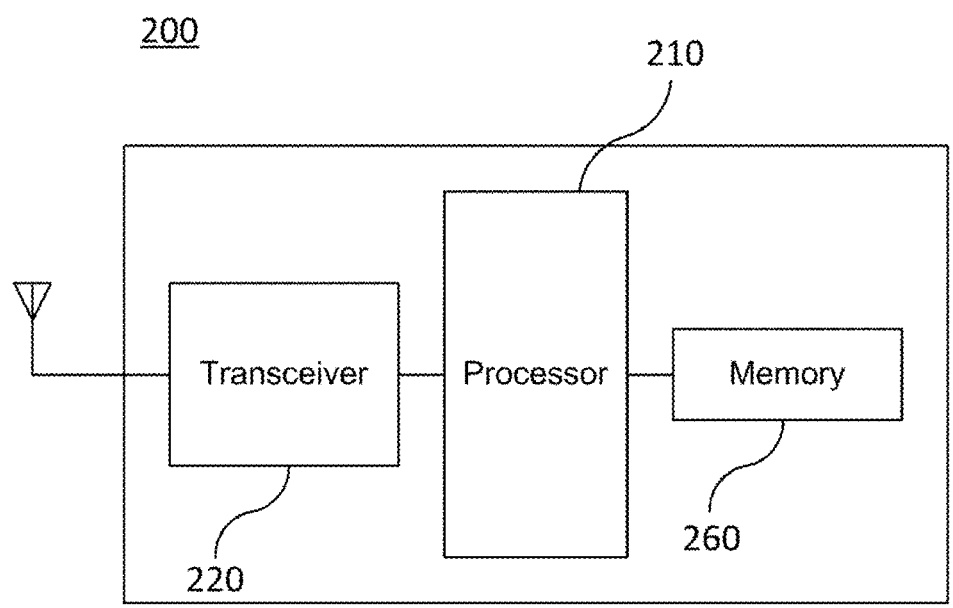
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
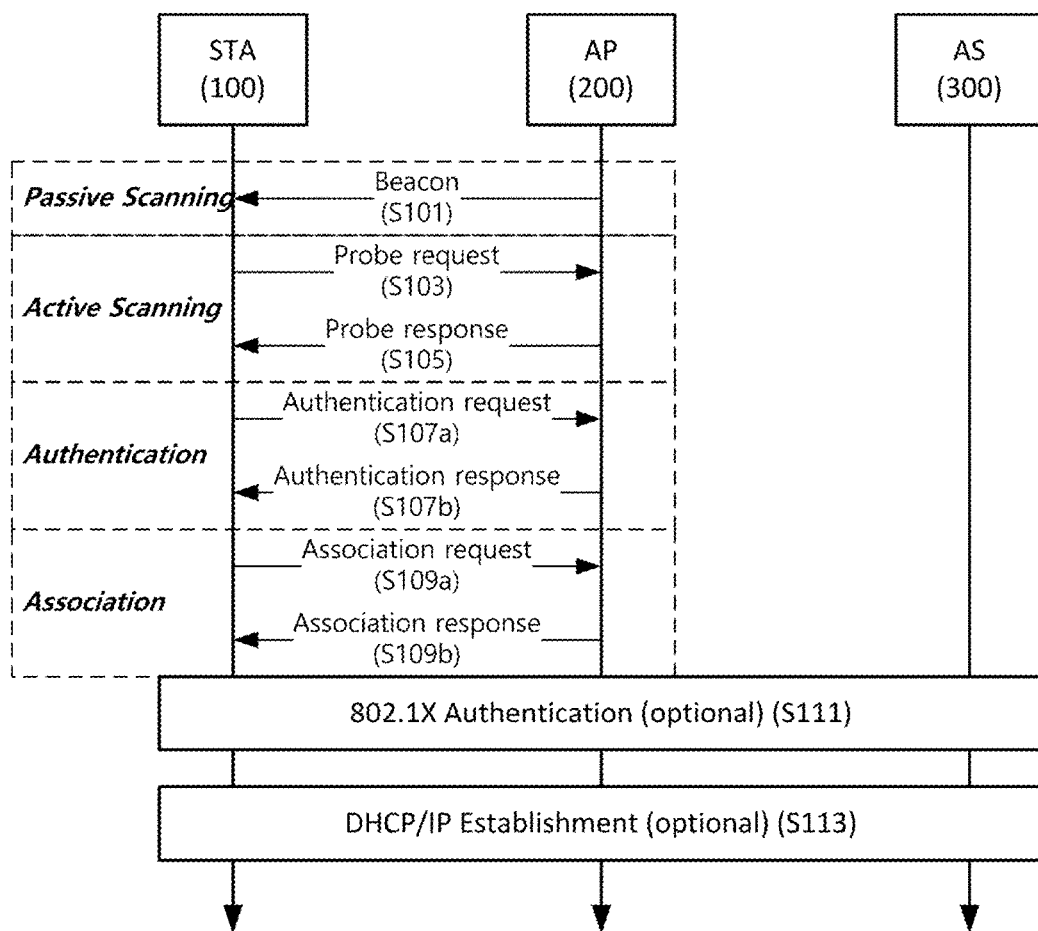
FIG. 5 is a diagram schematically illustrating a process in which a STA establishes a link with an AP.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
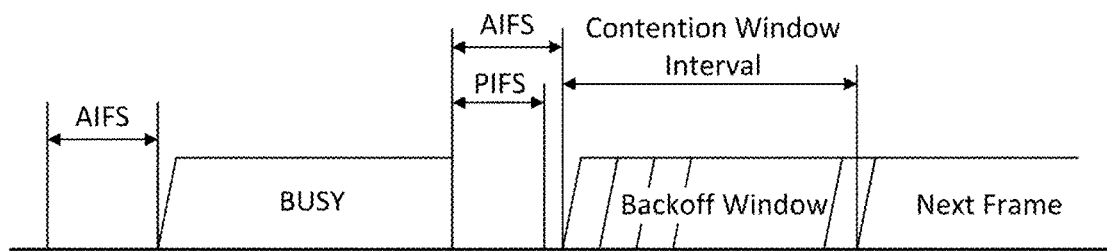
FIG. 6 is a diagram illustrating a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
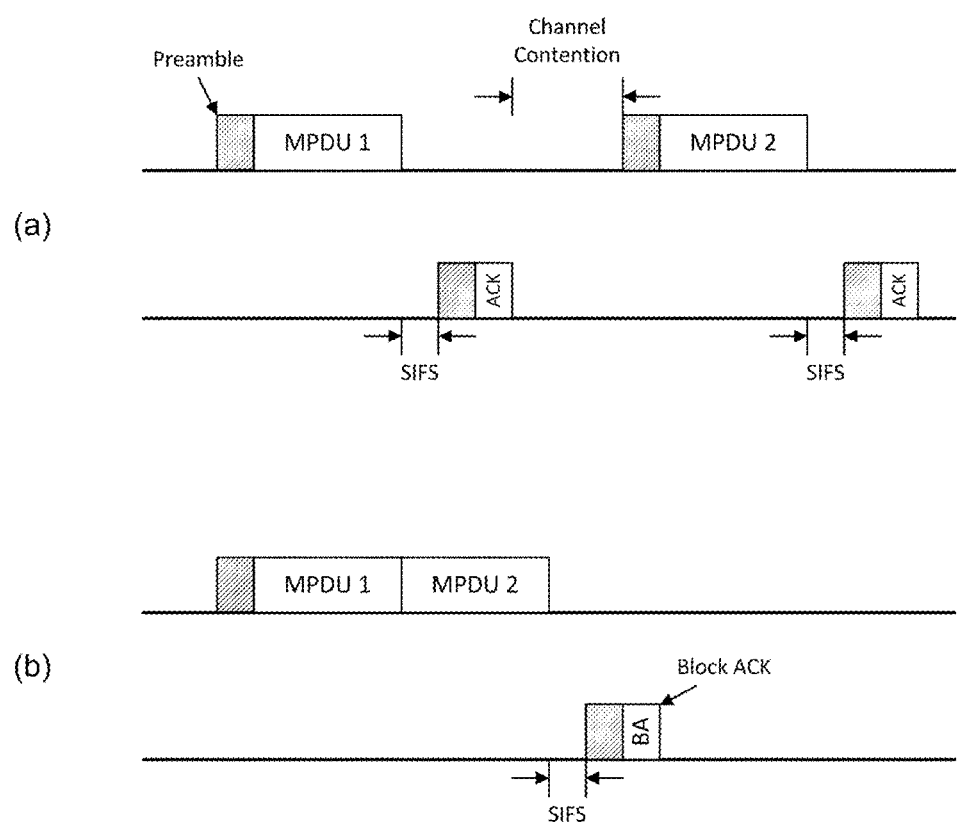
FIG. 7 is a diagram comparing a data communication method using an individual MAC protocol data unit (MPDU) and a data communication method using an Aggregated MPDU (A-MPDU).

FIG. 7 compares a data communication method using an individual MAC protocol data unit (MPDU) and a data communication method using an Aggregated MPDU (A-MPDU).

First, FIG. 7(a) illustrates a communication method using an individual MPDU. Referring to FIG. 7(a), in a general data transmission process, an individual MPDU and corresponding ACK are sequentially transmitted. That is, when a transmitting terminal desires to transmit a plurality of MPDUs (e.g., MPDU 1, MPDU 2), the transmitting terminal transmits the first MPDU (i.e., MPDU 1) and receives an ACK corresponding thereto, and after a channel contention interval, the transmitting terminal transmits the next MPDU (i.e., MPDU 2) and receives an ACK corresponding thereto.

However, when performing the data communication method using A-MPDU as shown in FIG. 7(b), the transmitting terminal aggregates a plurality of MPDUs (e.g., MPDU 1, MPDU 2) after a single preamble and transmits them together as a single PHY protocol data unit (PPDU). In an embodiment of the present invention, the preamble may be used as a concept including a PHY header. Likewise, a frame in which a plurality of MPDUs are aggregated in a single PPDU is referred to as an A-MPDU. According to the present invention, the A-MPDU may be composed of a plurality of data MPDUs, or may include at least one data MPDU and at least one control MPDU. A receiving terminal receiving the A-MPDU from the transmitting terminal transmits a block ACK (BA) corresponding thereto. The block ACK (BA) includes information indicating the success or failure of transmission of each of a plurality of MPDUs constituting the corresponding A-MPDU. More specifically, the block ACK (BA) may include a block ACK bitmap field representing the reception state of the receiving terminal for each MPDU. According to an exemplary embodiment, the block ACK bitmap may individually indicate the success or failure of transmissions up to 64 MPDUs by using an 8-bytes bitmap.

In an embodiment of the present invention, the transmitting terminal refers to a terminal that transmits data, that is, an MPDU or an A-MPDU. In addition, the receiving terminal refers to a terminal that receives the data and transmits a corresponding ACK or block ACK. In case of uplink transmission, the transmitting terminal may represent a non-AP STA, and the receiving terminal may represent an AP, respectively. Furthermore, in case of downlink transmission, the transmitting terminal may represent an AP, and the receiving terminal may represent a non-AP STA, respectively.

Figure 8:
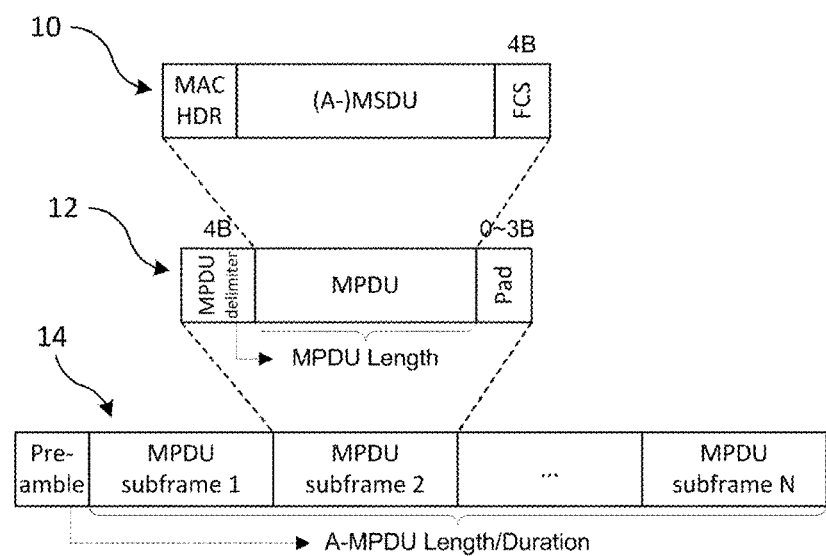
FIG. 8 is a diagram illustrating a detailed configuration of an A-MPDU according to an embodiment of the present invention.

FIG. 8 illustrates a detailed configuration of an A-MPDU according to an embodiment of the present invention. The A-MPDU generating process described in FIG. 8 can be performed by the transmitting terminal according to the present invention.

First, an MPDU 10 combines a MAC header (MAC HDR) and a frame check sequence (FCS) for determining whether there is an error with a MAC service data unit (MSDU) or an aggregated MSDU (A-MSDU) in an upper layer. The maximum length of the MPDU 10 according to the IEEE 802.11ac standard is set to 11,454 bytes.

When a plurality of MPDUs 10 are to be aggregated to generate an A-MPDU 14, the transmitting terminal may generate an MPDU subframe 12 in which an MPDU delimiter an a pad are combined before and after the MPDU 10. In this case, the MPDU delimiter comprises an end-of-frame (EOF) field representing whether the corresponding MPDU subframe 12 is the last MPDU subframe 12 of the A-MPDU 14, an MPDU length field representing the length of each MPDU 10, a cyclic redundancy check (CRC) field, a signature field, and the like.

The A-MPDU 14 includes a plurality of MPDU subframes (e.g., MPDU subframe 1, . . . , MPDU subframe N) and may be composed of a maximum of N MPDU subframes 12. According to an embodiment, when the block ACK bitmap transmitted corresponding to the A-MPDU has a size of 8 bytes, the N may be set to 64.

Meanwhile, a preamble located at the front of the A-MPDU 14 includes a legacy signal field (L-SIG), and the L-SIG includes a legacy rate (L-Rate) field and a legacy length (L-Length) field. The L-Rate represents such as the transmission rate, the modulation scheme, and the coding rate of the transmission data. The L-Length represents the size (e.g. number of bytes) of the transmission data.

The receiving terminal may obtain information on the number of transmission bits per OFDM symbol of the transmission data based on a modulation and coding scheme (MCS) indicated by the L-Rate field, and may obtain the number of OFDM symbols constituting the transmission data by dividing the L-Length field information by the information on the number of transmission bits. According to an embodiment, when the L-Rate is set to 6 Mbps, which is the minimum transmission rate of an orthogonal frequency division multiplexing (OFDM) packet, the maximum number of symbols that can be represented through a combination of L-Rate/L-Length is 1365 or 1366. In this case, the length (i.e., duration) of one OFDM symbol may be set to 4 us, and the L-SIG may set the length (i.e., duration) of the corresponding data packet up to 5.460 ms or 5.464 ms through a combination of L-Rate/L-Length. In this manner, the L-SIG of the A-MPDU 14 may represent the packet duration information of the A-MPDU 14 in units of symbols through a combination of the L-Rate field and the L-Length field.

The receiving terminal receiving the A-MPDU 14 sets a network allocation vector (NAV) based on the number of OFDM symbols obtained through the combination of the L-Rate field and the L-Length field of the L-SIG, and defers transmission for the corresponding channel. In this case, since the L-SIG can be recognized by legacy terminals such as IEEE 802.11a, n, etc., interference by other terminals during the transmission period of the A-MPDU 14 can be prevented.

Figure 9:
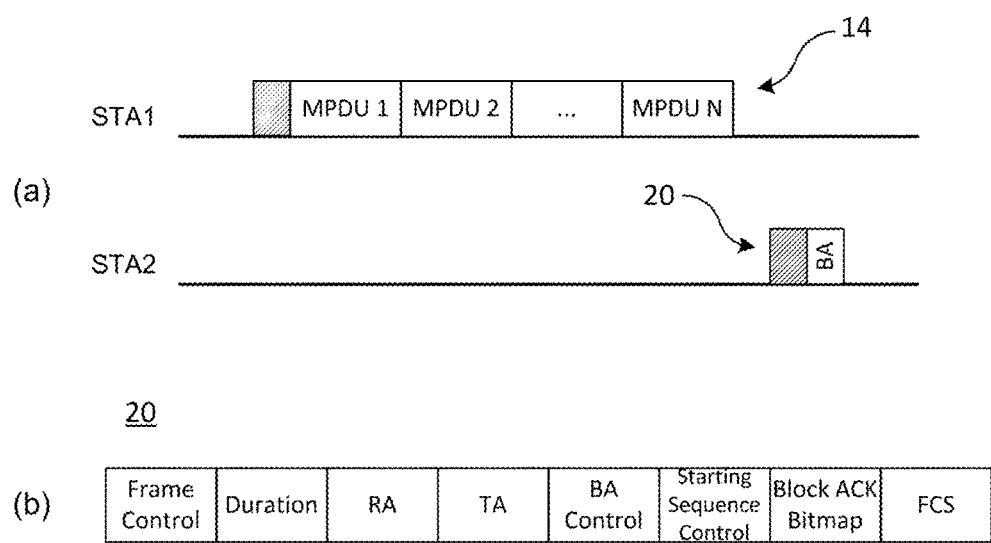
FIG. 9 is a diagram illustrating a data communication method using an A-MPDU and a corresponding block ACK according to an embodiment of the present invention.

FIG. 9 illustrates a data communication method using an A-MPDU and a corresponding block ACK according to an embodiment of the present invention. In FIG. 9, STA1 indicates a transmitting terminal which transmits an A-MPDU 14, and STA2 indicates a receiving terminal which receives the A-MPDU 14 and transmits a block ACK 20.

Referring to FIG. 9(*a*), STA1 generates an A-MPDU 14 including a plurality of MPDUs (e.g., MPDU 1, MPDU 2, . . . , MPDU N), and transmits the generated A-MPDU 14. The STA2 receiving the A-MPDU 14 may fail to normally receive a specific MPDU according to a channel condition or a collision. In this case, the STA2 may notify the STA1 of the MPDU that has successfully received and the MPDU that failed to receive by indicating them through the bitmap of the block ACK 20.

FIG. 9(*b*) illustrates a detailed structure of the block ACK 20 according to an embodiment of the present invention. The block ACK 20 includes ACK information for a plurality of MPDUs constituting the A-MPDU 20. Referring to FIG. 9(*b*), the block ACK 20 may include a frame control field, a duration field, a receiver address (RA) field, a transmitter address (TA) field, a block ACK control (BA control) field, starting sequence control field, a block ACK bitmap field, and a frame check sequence (FCS) field.

The block ACK control (BA control) field comprises setting information relating to the configuration of the block ACK 20. The starting sequence control field represents the sequence number of the first MPDU among MPDUs received through the A-MPDU 14. In addition, each bit of the block ACK bitmap field represents the success or failure of reception of MPDUs starting from the first MPDU by flag information. The first bit of the block ACK bitmap field corresponds to the MPDU of the sequence number matched with the starting sequence control field. When the value of each bit of the block ACK bitmap field is 1, it is indicated that the MPDU corresponding to the relevant bit has been successfully received. Accordingly, when the n-th bit of the block ACK bitmap is 1, it is indicated that the MPDU having the sequence number of 'block ACK sequence control+n' has been successfully received. However, when the n-th bit of the block ACK bitmap is 0, it is indicated that the MPDU having the sequence number of 'block ACK sequence control+n' is not received. If the block ACK bitmap has a size of 8 bytes, the 'n' may have a value between 0 and 63.

According to the embodiment of the present invention, communication can be performed by variously modifying the A-MPDU 14 and the block ACK 20 in order to improve data transmission performance in a high-density environment. The transmitting terminal and the receiving terminal of the present invention can perform data communication according to the embodiments described below or a combination thereof.

If an ACK corresponding to the data is not received after transmitting the data, the WLAN terminal determines that a collision has occurred between the terminals as described above with reference to FIG. 6, and increases the contention window twice to access the channel. In addition, the WLAN terminal may selectively perform a link adaptation process to change the modulation and coding scheme (MCS) of transmission data. That is, the terminal may increase the probability of transmission success of data by transmitting new data using an MCS that is more robust than an MCS used in the previous transmitted data.

According to an embodiment of the present invention, the transmitting terminal may adjust the channel access method based on the block ACK bitmap information of the received block ACK 20. In this case, the channel access method indicates at least one of the size of the contention window for the backoff procedure and the MCS applied to the data to be transmitted, but the present invention is not limited thereto. The transmitting terminal may adjust the channel access method based on the number and distribution of bits having a value of 0 (hereinafter, referred to as 'MPDU reception failure information') in the block ACK bitmap of the block ACK 20.

When a plurality of MPDUs are transmitted together through the A-MPDU 14, the probability of reception failure of the receiving terminal increases as the MPDU is located at the rear side. This phenomenon is more likely to occur due to a decrease in accuracy of channel estimation based on a preamble at a receiving terminal as data transmission time increases, rather than due to a collision with another terminal. Therefore, according to the embodiment of the present invention, the channel access method of the transmitting terminal can be determined based on the distribution of the MPDU reception failure information in the block ACK bitmap.

According to an embodiment of the present invention, the transmitting terminal receiving the block ACK 20 may divide the block ACK bitmap of the block ACK 20 into a plurality of sections and obtain the number of MPDU reception failure information for each section. According to an embodiment, the block ACK bitmap may be divided into two or more sections including a first section and a second section. In this case, the first section is a section preceding the second section. Each of the sections may indicate the first half and the second half of the block ACK bitmap, or may indicate a section of a predetermined length, respectively. According to an embodiment of the present invention, when the number of MPDU reception failure information in the first section of the block ACK bitmap is equal to or greater than a predetermined first threshold, the transmitting terminal may determine that a collision has occurred between the terminals and increase the contention window for the backoff procedure. On the other hand, when the number of MPDU reception failure information in the second section of the block ACK bitmap is equal to or greater than a predetermined second threshold, the transmitting terminal may determine that a channel estimation error has occurred and perform the link adaptation process. Furthermore, when the number of MPDU reception failure information in the second section of the block ACK bitmap is equal to or greater than a predetermined third threshold, the transmitting terminal may reduce the number (i.e., aggregation size) of MPDUs aggregated in the A-MPDU 14. In this case, the first threshold, the second threshold, and the third threshold may be set to the same value or may be set to different values. According to an embodiment, the third threshold may be set to a value greater than the second threshold.

Meanwhile, although it is described that the block ACK bitmap is divided into two sections in the above embodiment, the present invention is not limited thereto, and the block ACK bitmap may be divided into further sections. For example, the block ACK bitmap may be divided into four sections including a first section, a second section, a third section, and a fourth section. The transmitting terminal may increase the contention window based on the number of MPDU reception failure information of the first section and perform the link adaptation process based on the number of MPDU reception failure information of the fourth section. According to another embodiment of the present invention, instead of the number of MPDU reception failure information in each section, an MPDU reception failure rate can be used to adjust the channel access method. That is, the transmitting terminal may perform the contention window increase and/or a link adaptation process based on whether the ratio of the number of MPDU reception failure information to the total number of bits in each segment is equal to or greater than a predetermined threshold.

According to another embodiment of the present invention, the transmitting terminal may adjust the channel access method based on the cumulative distribution of bits having a value of 1 (hereinafter, 'MPDU reception success information') in the block ACK bitmap of the block ACK 20. The transmitting terminal may generate a graph based on the cumulative distribution. The variable x in the graph represents the bit order 'n' in the block ACK bitmap and the variable y in the graph represents the cumulative number of MPDU reception success information up to the bit order 'n'. If all the MPDUs included in the A-MPDU 14 are successfully received, the graph represents y=x (the first shape). However, if the reception of some intermediate MPDUs in the A-MPDU 14 fails and subsequent MPDUs are successfully received again, the graph will represent a multi-stepped form (the second shape). In addition, if the reception of all the MPDUs after a specific time point in the A-MPDU 14 fails, the graph will represent a single step form (the third shape). According to the embodiment of the present invention, when the graph based on the cumulative distribution represents the second shape, the transmitting terminal may determine that a collision with another terminal has occurred and increase the contention window value. In addition, when the graph based on the cumulative distribution represents the third shape, the transmitting terminal may determine that a channel estimation error has occurred after a specific MPDU and perform the link adaptation process.

According to yet another embodiment of the present invention, the transmitting terminal may additionally consider the maximum number (hereinafter, referred to as 'N_Max') of MPDUs that can be aggregated and the number (hereinafter, referred to as 'N_Used') of actually aggregated MPDUs of the A-MPDU 14 to adjust the channel access method. In this case, N_max may be a predetermined value or a value determined by mutual negotiation between the transmitting terminal and the receiving terminal. The transmitting terminal may adjust the channel access method based on the N_Used value or the ratio of N_Used to N_Max. More specifically, the transmitting terminal may adjust at least one of thresholds (i.e., the first threshold, the second threshold, and the third threshold) of each section of the block ACK bitmap for adjusting the channel access method based on the N_Used value. The transmitting terminal may increase at least one of the thresholds for each section as the N_Used value increases, since the error probability of data reception becomes higher as the N_Used value increases. Also, the transmitting terminal may increase at least one of the thresholds for each section as the ratio of N_Max to N_Used increases.

According to still another embodiment of the present invention, the transmitting terminal may adjust the channel access method based on the position (hereinafter, referred to as a 'reception failure start position') of the bit in which the MPDU reception failure information first appears in the block ACK bitmap. The reception failure start position may represent a period during which the channel estimation of the reception terminal is effectively applied, that is, a coherence time. The transmitting terminal may obtain the coherence time information based on the reception failure start position information. The transmitting terminal may increase the MCS or reduce the number (i.e., aggregation size) of MPDUs which are aggregated so that the duration of the A-MPDU 14 transmitted thereafter to be within the coherence time.

According to still yet another embodiment of the present invention, the transmitting terminal may classify the MPDUs included in the A-MPDU 14 into a plurality of groups, and transmit them by applying separate MCSs to each group. That is, the transmitting terminal may generate an A-MPDU 14 including a plurality of MPDU groups to which independent MCSs are applied, respectively, and transmit the generated A-MPDU 14. In this case, each MPDU group is composed of at least one MPDU.

The A-MPDU 14 according to the embodiment of the present invention may include different types of MPDU groups. For example, the A-MPDU 14 may include at least one data MPDU group and at least one control MPDU group. The data MPDU group is composed of at least one data MPDU (i.e., data frame), and may be located before the control MPDU group according to an embodiment. The control MPDU group is composed of at least one control MPDU (i.e., control frame), and the first MPDU of the control MPDU group may indicate the start of the control MPDU group through an MPDU delimiter, and the like. Information indicating the start of the control MPDU group can be indicated through a predetermined bit of the MPDU delimiter. According to an embodiment, a reserved bit of the MPDU delimiter defined in the legacy wireless LAN (e.g., IEEE 802.11ac) standard may be used as the predetermined bit.

The control MPDU constituting the control MPDU group may include various types of control frames. For example, the control MPDU group may include a trigger frame that solicits simultaneous transmission of uplink data of multiple users. In addition, the control MPDU group may include a multi-STA block ACK corresponding to uplink data simultaneously transmitted by multiple users. According to an embodiment, the AP may transmit an A-MPDU 14 including the trigger frame, and the plurality of non-AP STAs receiving the A-MPDU 14 may simultaneously transmit uplink data at the timing indicated by the trigger frame. The AP receiving uplink data from the plurality of non-AP STAs may transmit an A-MPDU 14 including multi-STA block ACK frame corresponding thereto. According to an embodiment of the present invention, the control MPDU group is located after the data MPDU group and includes the last MPDU of the A-MPDU 14. That is, the trigger frame and/or the multi-STA block ACK frame may constitute the last MPDU of the A-MPDU 14. However, specific positions of the data MPDU group and the control MPDU group in the present invention are not limited thereto. That is, according to another embodiment of the present invention, the control MPDU group may be located before the data MPDU group and include the first MPDU of the A-MPDU 14. That is, the trigger frame and/or the multi-STA block ACK frame may constitute the first MPDU of the A-MPDU 14.

The transmitting terminal may apply a specific MCS selected from an MCS set including a plurality of MCSs to the MPDU. A specific MCS can be indicated by an MCS index in the MCS set, and a lower MCS index value may indicate a robust MCS. According to the embodiment of the present invention, an MCS that is more robust than an MCS applied to the MPDU of the data MPDU group may be applied to the MPDU of the control MPDU group. For example, if an MCS of index 9 is applied to the data MPDU group, then a more robust MCS of index 8 may be applied to the control MPDU. According to another embodiment, an MCS indicated by the preamble information of the corresponding PPDU may be applied to the data MPDU group, and a predetermined MCS such as the binary phase shift keying (BPSK) modulation may be applied to the control MPDU. In this manner, the transmitting terminal may apply a more robust MCS to the control MPDU among the plurality of MPDUs constituting the A-MPDU 14, thereby increasing the probability of the transmission success of the control MPDU.

MPDU groups to which different MCSs are applied in the A-MPDU 14 can be identified in various ways. According to an embodiment, the A-MPDU 14 may sequentially include a first MPDU group and a second MPDU group to which different MCSs are applied. In this case, the preamble information corresponding to the A-MPDU 14 (i.e., the preamble information of the PPDU) may indicate a basic MCS applied to the A-MPDU 14, and the basic MCS may be applied to the first MPDU group. On the other hand, the second MPDU group to which an MCS different from the basic MCS is applied may be identified through information transmitted by the first MPDU of the corresponding group. For example, MPDU delimiter information of the first MPDU of the second MPDU group may indicate that an MCS different from the basic MCS is applied to the second MPDU group. According to an embodiment, the MPDU delimiter information may indicate whether the MCS is changed by flag information through a predetermined bit. As described above, the reserved bit of the MPDU delimiter defined in the legacy wireless LAN (e.g., IEEE 802.11ac) standard may be used as the predetermined bit.

In this manner, when the specific MPDU in the A-MPDU 14 includes information indicating the change of the MCS, the changed MCS is applied to the corresponding MPDU and the subsequent MPDUs. According to an embodiment of the present invention, when the MPDU delimiter information of the first MPDU of the second MPDU group indicates the change of the MCS, a predetermined MCS, for example, binary shift keying (BPSK) modulation may be applied to the second MPDU group. According to another embodiment, an MCS having an MCS index difference of a predetermined offset with an MCS applied to the first MPDU group may be applied to the second MPDU group. In this case, the MCS applied to the second MPDU group may have an MCS index lower than the MCS applied to the first MPDU group. For example, if the predetermined offset is 3 and the MCS of index 5 is applied to the first MPDU group, the MCS of index 2 may be applied to the second MPDU group.

Meanwhile, the A-MPDU 14 includes the first MPDU group and the second MPDU group in the above-described embodiment, but the present invention is not limited thereto, and the A-MPDU 14 may include a larger number of MPDU groups. In this case, the first MPDU of each MPDU group of the A-MPDU 14 may indicate information indicating the change of the MCS through the MPDU delimiter or the like. The MCSs applied to each MPDU group may be set to have sequentially lower MCS index values. However, the present invention is not limited thereto, and the MCS of an MCS index value higher than that of the previous MPDU group may be applied to a particular MPDU group.

In this manner, the transmitting terminal may change the MCS of the entire MPDUs or some MPDUs of the A-MPDU 14 and transmit the A-MPDU 14 according to various embodiments described above. If a second A-MPDU to which an MCS different from the previously transmitted first A-MPDU is transmitted, the transmitting terminal may perform the adjusting the channel access method by placing a higher weight on the block ACK information (e.g., the block ACK bitmap) corresponding to the second A-MPDU.

Figure 11:
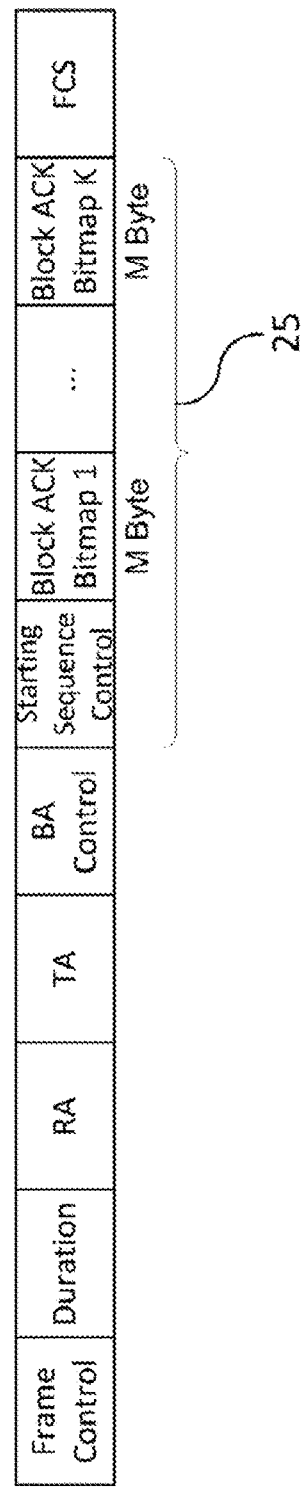
FIG. 11 is a diagram illustrating another embodiment of a block ACK frame structure corresponding to an A-MPDU.
Figure 12:
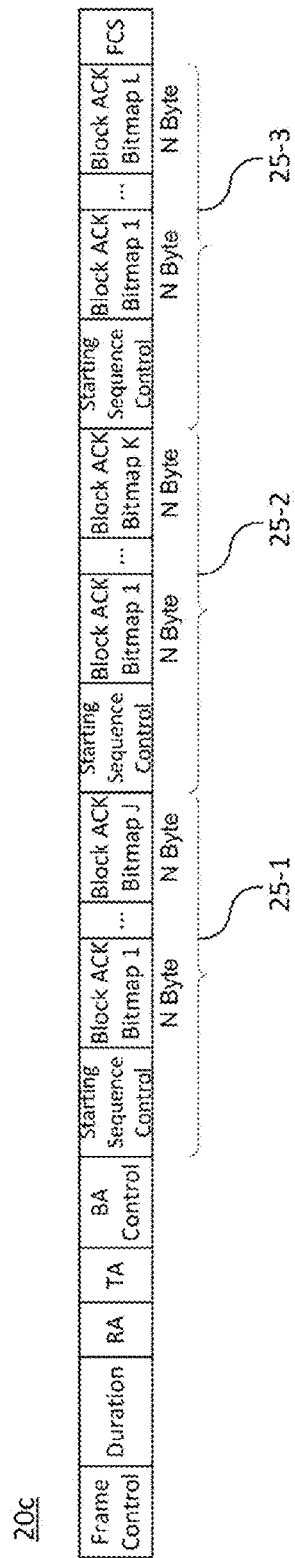
FIG. 12 is a diagram illustrating yet another embodiment of a block ACK frame structure corresponding to an A-MPDU.

FIG. 10 to FIG. 12 illustrate various embodiments of the block ACK corresponding to the A-MPDU. When data is transmitted in a wide frequency bandwidth, a high MCS, and a multi-spatial stream, a plurality of MPDUs can be aggregated into one A-MPDU. However, in the case of the block ACK used in the legacy WLAN standard, information that can be represented through the block ACK bitmap is only 64 bits. Therefore, when the A-MPDU is composed by aggregating more than 64 MPDUs, it is necessary to provide a new structure of the block ACK indicating whether or not each MPDU is successfully received.

FIG. 10 illustrates an embodiment of a block ACK frame structure corresponding to an A-MPDU. According to an embodiment of the present invention, the block ACK bitmap field of the block ACK 20a may be set to a size of 8 bytes by default. The transmitting terminal may transmit an A-MPDU aggregated with multiple of 64 MPDUs. When the block ACK 20a corresponding to the A-MPDU is transmitted, the receiving terminal indicates success or failure of reception of at least one MPDU by each bit of the block ACK bitmap. More specifically, when the number of MPDUs aggregated in the A-MPDU is n times 64, each bit of the block ACK bitmap of the block ACK 20a indicates success or failure of reception of n MPDUs. If all of the n MPDUs corresponding to a particular bit of the block ACK bitmap have been successfully received, the corresponding bit may be set to one. However, if at least one of the n MPDUs corresponding to a particular bit of the block ACK bitmap is not received, the corresponding bit may be set to zero. When a value of a particular bit of the block ACK bitmap is set to 0, the transmitting terminal retransmits n MPDUs corresponding to the particular bit.

For example, if the transmitting terminal transmits 128 MPDUs (n=2), the receiving terminal may successfully receive the 1st to 127th MPDUs and fail to receive the 128th MPDU. In this case, the receiving terminal may transmit the block ACK 20a in which the 1st to 63rd bits of the block ACK bitmap field are set to 1 and the 64th bit of the block ACK bitmap field is set to 0. The 64th bit of the block ACK bitmap field corresponds to the 127th MPDU and the 128th MPDU of the A-MPDU transmitted by the transmitting terminal. The transmitting terminal retransmits the 127th MPDU and the 128th MPDU in response to the block ACK 20a of the receiving terminal. The receiving terminal receiving the 127th MPDU and the 128th MPDU retransmitted may selectively process only the 128th MPDU that was not received in the previous step.

FIG. 11 illustrates another embodiment of a block ACK frame structure corresponding to an A-MPDU. Referring to FIG. 11, the block ACK 20b may include a bitmap set 25 composed of a plurality of block ACK bitmap fields. Each block ACK bitmap field constituting the bitmap set 25 is set to a size of M bytes, and the number K of block ACK bitmap fields can be indicated by a block ACK control (BA Control) field. Therefore, the bitmap set 25 of the block ACK 20b is composed of a total of M*K*8 bits, and may indicate information on the success or failure of reception of the number of MPDUs corresponding to the bits.

FIG. 12 illustrates yet another embodiment of a block ACK frame structure corresponding to an A-MPDU. Referring to FIG. 12, the block ACK 20c may include a plurality of bitmap sets 25-1, 25-2, and 25-3. Each bitmap set 25-1, 25-2, and 25-3 is composed of a plurality of block ACK bitmap fields as described above with reference to FIG. 11. Each block ACK bitmap field constituting the bitmap sets 25-1, 25-2 and 25-3 is set to a size of N bytes, and the number of block ACK bitmap fields constituting one bitmap set may be set differently for each of the bitmap sets 25-1, 25-2, and 25-3. Information on the number (e.g., J, K, L) of bitmap fields for each bitmap set 25-1, 25-2, and 25-3 may be indicated by a block ACK control (BA Control) field.

According to an embodiment, each bitmap set 25-1, 25-2, and 25-3 may include a separate starting sequence control field, thereby transmitting ACK information for a plurality of MPDUs having sequence numbers of various and discontinuous combinations. In the embodiment of FIG. 12, the first bitmap set 25-1, the second bitmap set 25-2, and the third bitmap set 25-3 included in the block ACK 20c are composed of J, K and L block ACK bitmap fields, respectively. Therefore, the plurality of bitmap sets 25-1, 25-2, and 25-3 of the block ACK 20c are composed of a total of (J*N+K*N+L*N)*8 bits, and it is possible to indicate information on the success or failure of reception of the number of MPDUs corresponding to the bits. As described above, the terminal of the present invention may transmit a response to a plurality of MPDUs using an extended type of block ACK frame according to the embodiment of FIGS. 10 to 12.

Figure 13:
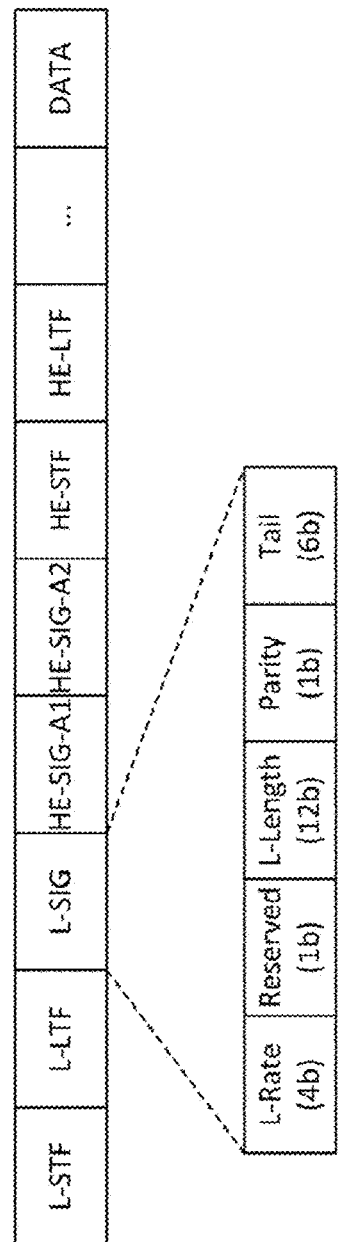
FIG. 13 is a diagram illustrating an embodiment for expressing a length of an extended A-MPDU using L-SIG of a preamble.

FIG. 13 illustrates an embodiment for expressing a length of an extended A-MPDU using L-SIG of a preamble. As described in the embodiment of FIG. 8, the duration information of the A-MPDU can be obtained through a combination of the L-Rate field and the L-Length field of the L-SIG. However, in the legacy WLAN standard, the minimum value of the OFDM-based L-Rate is 6 Mbps, and the maximum value of the duration that L-Length can represent is 1366 symbols. Assuming that one symbol is 4 us, the maximum value of A-MPDU duration that can be expressed through L-SIG is limited to 5.464 ms.

According to an embodiment of the present invention, the transmitting terminal may set the value of the L-Rate field of the corresponding L-SIG to 1 Mbps or 2 Mbps lower than 6 Mbps, which is the lowest rate allowed in the OFDM frame, when the A-MPDU is transmitted. Accordingly, the transmitting terminal can transmit the A-MPDU with a maximum duration of 6 times or 3 times longer by combining the existing L-Length field and the new L-Rate.

According to another embodiment of the present invention, the transmitting terminal may combine the reserved field of the L-SIG with the L-length to indicate the length information of the packet. In this case, the transmitting terminal can indicate a duration of a value higher than a maximum of 1366 symbols through the L-SIG. According to an embodiment, the transmitting terminal may set the value of the L-Length field to a maximum value, and scale the L-Length value by 2 or 1 times by setting the value of the reserved field to 1 or 0. Since the legacy terminals do not use the information of the reserved field, it is possible to obtain the duration information of the packet only by using the information of the L-Length field, and the increase of the packet duration through the reserved field can be interpreted only by the non-legacy terminals.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal comprising:
a transceiver; and
a processor,
wherein the processor is configured to:
transmit an aggregate MAC protocol data unit (A-MPDU) including one or more MAC service data units (MSDUs) or aggregate MSDUs (A-MSDUs), and
receive a block ACK for acknowledgment (ACK) transmission in response to one or more MSDUs or A-MSDUs,
wherein the block ACK includes one or more bitmap sets and a single block ACK control field,
wherein each of the one or more bitmap sets includes a starting sequence control field and a block ACK bitmap field according to a type of the block ACK indicated by the single block ACK control field,
wherein the block ACK bitmap field included in the each of the one or more bitmap sets indicates success or failure of reception of each of the one or more MPDUs or A-MPDU,
wherein a length of the block ACK bitmap field is variable according to the type of the block ACK,
wherein the block ACK control field indicates the type of the block ACK and a set of lengths of each of the block ACK bitmap field included in the one or more bitmap sets according to the type of the block ACK,
wherein the length of the block ACK bitmap field is determined as one of the lengths included in the set of the block ACK control field, and
wherein a number of MSDUs or A-MSDUs capable of transmitting an ACK is determined according to the length of the block ACK bitmap field.

2. The terminal of claim 1,
wherein the length of the block ACK bitmap field is indicated by a predetermined field of the block ACK.

3. The terminal of claim 1,
wherein the lengths correspond to multiples of M bytes according to the type of the block ACK indicated by the single block ACK control field.

4. The terminal of claim 1,
wherein the length of each block ACK bitmap field of the each of the one or more bitmap sets is independently determined as one of the lengths included in the set of the block ACK control field.

5. The terminal of claim 1,
wherein each bit of the block ACK bitmap field represents success or failure of reception of the one or more MPDUs or A-MSDUs starting from a first MPDU or a first MSDU indicated by a starting sequence control field of the block ACK.

6. A wireless communication method of a terminal comprising:
transmitting an aggregate MAC protocol data unit (A-MPDU) including one or more MAC service data units (MSDUs) or aggregate MSDUs (A-MSDUs), and
receiving a block ACK for acknowledgment (ACK) transmission in response to one or more MSDUs or A-MSDUs,
wherein the block ACK includes one or more bitmap sets and a single block ACK control field,
wherein each of the one or more bitmap sets includes a starting sequence control field and a block ACK bitmap field according to a type of the block ACK indicated by the single block ACK control field,
wherein the block ACK bitmap field included in the each of the one or more bitmap sets indicates success or failure of reception of each of the one or more MPDUs or A-MPDU,
wherein a length of the block ACK bitmap field is variable according to the type of the block ACK,
wherein the block ACK control field indicates the type of the block ACK and a set of lengths of each of the block ACK bitmap field included in the one or more bitmap sets according to the type of the block ACK,
wherein the length of the block ACK bitmap field is determined as one of the lengths included in the set of the block ACK control field, and
wherein a number of MSDUs or A-MSDUs capable of transmitting an ACK is determined according to the length of the block ACK bitmap field.

7. The terminal of claim 6,
wherein the length of the block ACK bitmap field is indicated by a predetermined field of the block ACK.

8. The terminal of claim 6,
wherein the lengths correspond to multiples of M bytes according to the type of the block ACK indicated by the single block ACK control field.

9. The terminal of claim 6,
wherein the length of each block ACK bitmap field of the each of the one or more bitmap sets is independently determined as one of the lengths included in the set of the block ACK control field.

10. The terminal of claim 6,
wherein each bit of the block ACK bitmap field represents success or failure of reception of the one or more MPDUs or A-MSDUs starting from a first MPDU or a first MSDU indicated by a starting sequence control field of the block ACK.

* * * * *